UNITED STATES PATENT OFFICE.

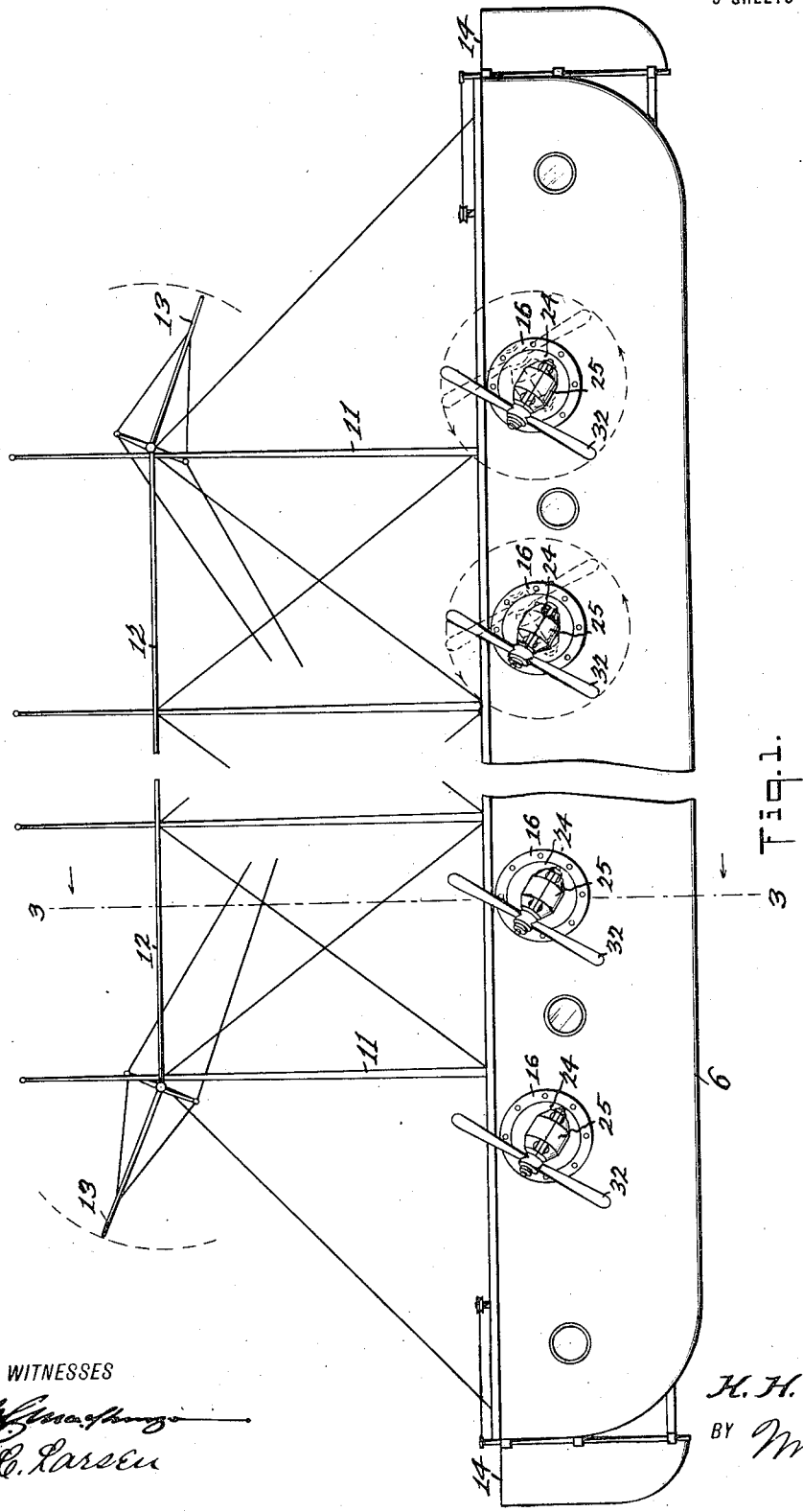

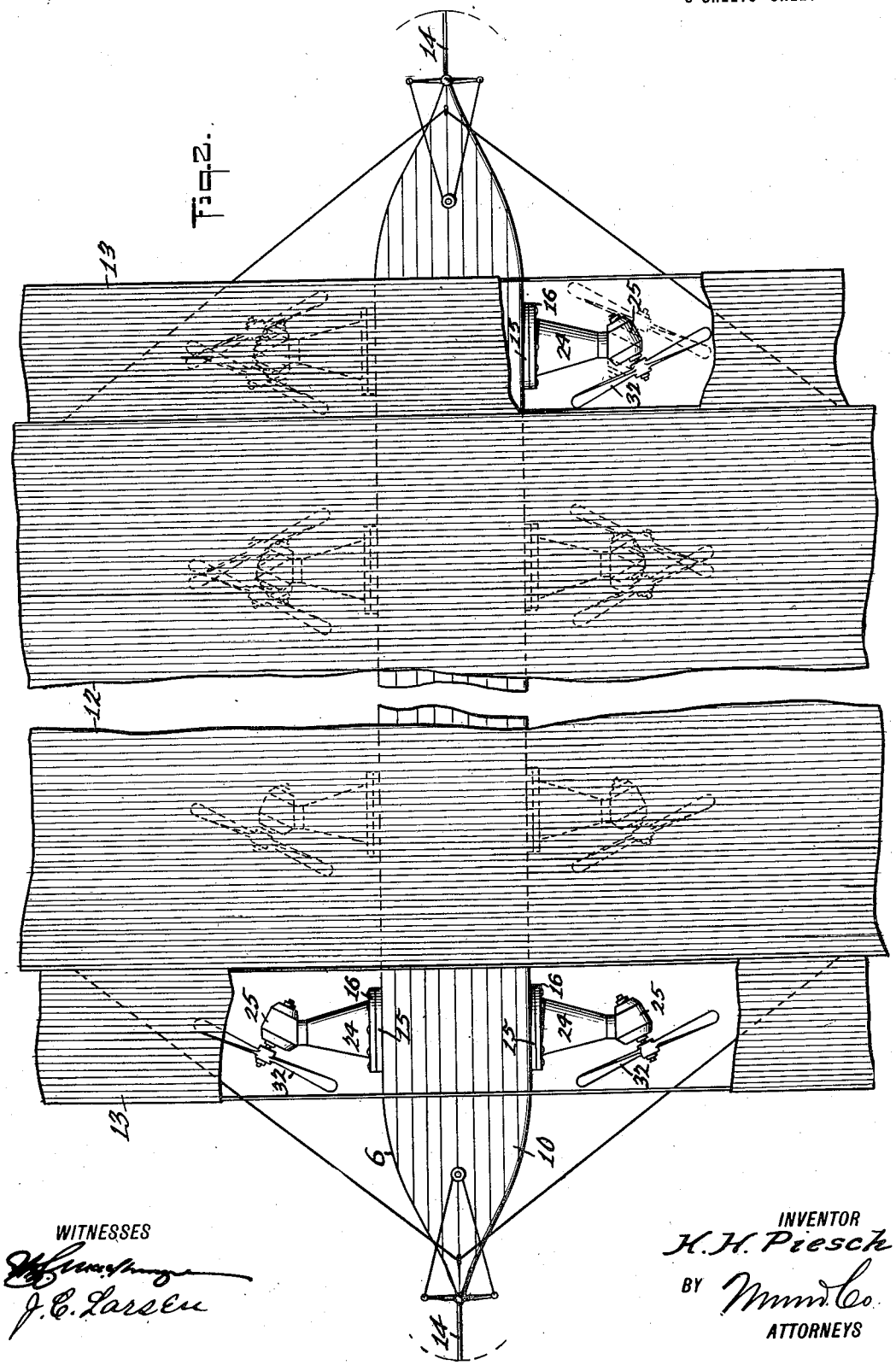

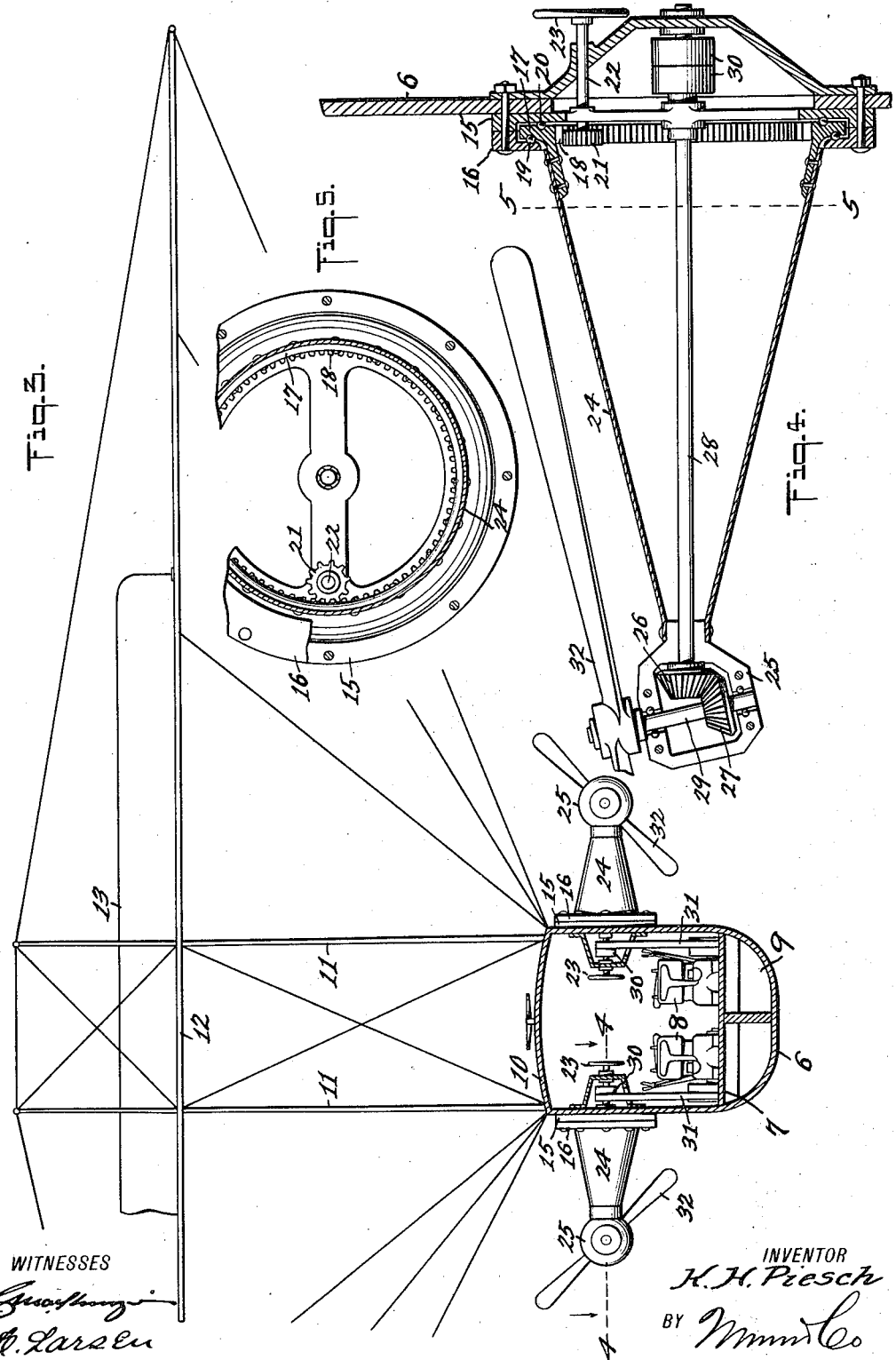

KARL H. PIESCH, OF NEW ORLEANS, LOUISIANA.

AEROPLANE.

1,250,649. Specification of Letters Patent. Patented Dec. 18, 1917.

Application filed January 24, 1917. Serial No. 144,204.

*To all whom it may concern:*

Be it known that I, KARL H. PIESCH, a subject of the Emperor of Austria, and a resident of New Orleans, in the parish of Orleans and State of Louisiana, have invented certain new and useful Improvements in Aeroplanes, of which the following is a specification.

My invention relates to air and water navigating vessels chiefly of the heavier than air type provided with sustaining planes, and among the main objects thereof are to provide a hull of boat form which is waterproof and may be made air-tight, which is provided with a plurality of independently operated propellers arranged in sets on opposite sides thereof and each of which is on a mount which may be rotated on a horizontal axis transversely of the hull whereby the positions of the propellers may be altered at will to propel the vessel in the air or in water, to turn the vessel in a circle of very short radius, to turn the vessel on its vertical axis, to instantly stop the vessel, and to hold the vessel motionless in the air.

My invention is fully described in the following specification, of which the accompanying drawings form a part, in which like characters refer to like parts in each of the views, and in which:—

Figure 1 is a side elevation of an aeroplane constructed in accordance with my invention;

Fig. 2 is a plan view thereof, with the planes partly broken away;

Fig. 3 is a section taken on the line 3—3 of Fig. 1;

Fig. 4 is a section taken on the line 4—4 of Fig. 3; and

Fig. 5 is a section taken on the line 5—5 of Fig. 4.

Referring to the drawings, 6 represents the hull of boat shape with the stem and stern of similar formation, a lower deck 7 being provided serving as a support for a plurality of motors 8 and forming a storage space 9 thereunder for fuel, water, oil, or other materials, and an upper deck 10 may be provided, and preferably will be, for protecting the interior of the hull against the admission of water and, if desired, of air as at high altitudes in which event the occupants of the vessel will be provided with air stored in compressed form in suitable containers.

The vessel is provided with masts 11 for the planes 12, with horizontally arranged rudders 13, and with vertically arranged rudders 14, and I prefer to form the deck 10 on an arc of a circle to serve as a stabilizer, and to prevent the vessel from turning over.

Secured to the sides of the hull, in the positions of the motors 8, are recessed plates 15 to which annular recessed plates 16 are bolted, each recess serving for the reception of a ring 17 the inner periphery of which is toothed at 18 to form an internal gear, suitable raceways being provided for ball bearings 19 and 20 whereby said ring may revolve in an anti-frictional manner by means of a pinion 21 on a shaft 22 provided with a hand wheel 23 interiorly of the hull 6.

Bolted or otherwise secured to the ring 17 in each recess in a conical casing 24 which carries a gear case 25 at its outer end for gears 26 and 27 secured to a drive shaft 28 and a stub shaft 29, respectively, the former of which carries pulleys 30 at its inner end connected with the respective motor by means of a belt 31, and the latter of which carries a propeller 32 arranged slightly out of parallelism with the drive shaft 28, as is clearly shown in Figs. 2 and 4.

From the foregoing it will be seen that each propeller has its own motor and may, therefore, be independently operated and each casing 24 may be rotated to revolve the propeller carried thereby around its drive shaft 28 irrespective of whether the propeller is operating or not.

There are preferably four propellers on each side of the hull any or all of which may be operated at will to propel the vessel backwardly or forwardly, to cause the vessel to turn in a circle, to bring the vessel to an abrupt stop, and, by causing two propellers on each side to counteract the other two, to hold the vessel motionless in the air, the propellers being swung about their pivots 28 by means of the respective hand wheels 23 into proper positions to accomplish the desired result.

The head casings 25 are made leak proof whereby any suitable lubricant may be contained therein and the conical casings 24 are also made waterproof whereby no water may enter the hull through the propeller mounts.

My aeroplane is well adapted for long flights, such as across oceans, because of the adaptability to meet varying conditions and of the great capacity for stores, and the vessel may be navigated in the sea as well as in the air, utilizing the same means of propulsion in each case and, in this connection, I will only utilize a part of the propeller battery in straightaway sailing, reserving the balance for emergencies which might arise, the location of the propellers rendering each as efficient as another and, when the propellers are set at a proper angle, they serve as an aid in arising from the ground or water although the horizontal rudders 13 will be used for this purpose in the usual manner.

The shape of the hull offers little resistance to air or water and my vessel is therefore capable of high speed as well as providing maximum comfort to the crew and passengers, if the latter are carried and, in the event of damage to the planes 12, the propellers may be swung so as to sustain the vessel in the air and to control the descent without the need for volplaning.

My invention is very simple, entirely practical, easily controlled, and comparatively inexpensive, and it may be made of great size to serve as public carriers, either for freight or passengers, or both.

While I have shown a preferred embodiment of the invention, it will be obvious that I may make structural changes thereover, provided that such changes do not depart from the spirit of the invention and come within the scope of the appended claims.

Having fully described my invention, what I claim as new, and desire to secure by Letters Patent, is:—

1. A self propelled conveyance comprising a water-tight boat shaped hull, sustaining means, steering means, a plurality of water-tight casings along the sides of the hull, a driving shaft extending along the axis of each casing, a propeller axle journaled in the outer end of the casing at an oblique angle to the driving shaft, connections between the two shafts, means to rotate said shafts and propeller from within the hull, and means to rotate the several casings around the axes of the driving shafts therein so as to revolve the propellers around the axes of said driving shafts.

2. A self propelled conveyance comprising a water-tight boat shaped hull, sustaining planes, rudders, a plurality of water-tight casings along each side of said hull, means to rotate the several casings, and an independently operated propeller carried by each casing.

3. An aeroplane, consisting of a boat shaped hull, sustaining planes, rudders, a plurality of recessed plates along each side of said hull, a ring provided with a casing revoluble in each plate, an independently operated propeller carried by each casing, and means interiorly of said hull for revolving said ring to revolve its propeller about a horizontal axis arranged transversely of said hull.

4. An aeroplane, consisting of a hull, sustaining planes, rudders, a plurality of recessed plates arranged along each side of said hull, a ring provided with an internal gear revoluble in each plate, a pinion enmeshed with each gear, a shaft for said pinion extended into said hull, a hand wheel on each shaft, a casing carried by said ring, and an independently operated propeller carried by each casing.

5. An aeroplane, consisting of a hull, sustaining planes, rudders, a plurality of recessed plates arranged along each side of said hull, a ring provided with an internal gear revoluble in each plate, means interiorly of said hull for revolving each ring, a casing carried by each ring, a gear case at the outer end of each casing, a drive shaft in each casing, a motor for each drive shaft, a gear on said drive shaft within said gear case, a stub shaft journaled in said gear case, a gear thereon enmeshed with said drive shaft gear, and a propeller on said stub shaft.

6. An aeroplane, consisting of a hull, sustaining planes, rudders, a plurality of rotatable casings on each side of said hull, means interiorly of said hull for operating said casings, a gear case on the outer end of each casing, a drive shaft in each casing, a motor therefor, a gear on the outer end thereof, a stub shaft arranged at an obtuse angle to the axis of said drive shaft, a gear thereon enmeshed with said drive shaft gear, and a propeller on said stub shaft arranged at an acuate angle to the axis of said drive shaft.

KARL H. PIESCH.